United States Patent [19]
Baum et al.

[11] Patent Number: 5,921,709
[45] Date of Patent: *Jul. 13, 1999

[54] PANEL DITCH CHECK FOR TEMPORARY EROSION AND SEDIMENT CONTROL

[75] Inventors: Michael R. Baum, Springfield; Leo R. Baum, Pleasant Hope, both of Mo.

[73] Assignee: Panel Products, Inc., Springfield, Mo.

[ * ] Notice: This patent is subject to a terminal disclaimer.

[21] Appl. No.: 08/837,597

[22] Filed: Apr. 21, 1997

Related U.S. Application Data

[63] Continuation-in-part of application No. 08/555,906, Nov. 13, 1995, Pat. No. 5,622,448.

[51] Int. Cl.$^6$ .................. E02B 3/14; E02B 7/08
[52] U.S. Cl. ........................... 405/16; 405/114
[58] Field of Search .................. 405/15, 16, 39, 405/52, 87, 90, 99, 100, 101, 114, 116

[56] References Cited

U.S. PATENT DOCUMENTS

| | | | |
|---|---|---|---|
| 1,318,656 | 11/1919 | Gerald | 405/91 |
| 1,381,427 | 6/1921 | Patrick | 405/91 |
| 1,852,268 | 4/1932 | Schmidt | 405/15 |
| 2,178,863 | 11/1939 | Pepper | 405/15 |
| 2,318,349 | 5/1943 | Wiley | 405/15 |
| 2,515,059 | 7/1950 | Rowbotham | 405/114 X |
| 4,031,676 | 6/1977 | Dally | 405/114 X |
| 4,362,432 | 12/1982 | Conover | 405/15 X |
| 4,756,511 | 7/1988 | Wright, III | 256/12.5 |
| 5,108,224 | 4/1992 | Cabaniss et al. | 405/52 |
| 5,114,270 | 5/1992 | Riddle | 405/15 |
| 5,297,895 | 3/1994 | Johnson | 405/41 |
| 5,345,741 | 9/1994 | Slater et al. | 52/646 |
| 5,370,480 | 12/1994 | Quaney | 405/284 |
| 5,622,448 | 4/1997 | Baum et al. | 405/15 |

OTHER PUBLICATIONS

From the "Design Manual" of the Missouri Highway & Transportation Department, Section 4–09.5(2), entitled "Temporary Erosion and Sediment Control," pp.7–10, dated May 15,1995.

A design specification of the Missouri Highway & Transportation Department, entitled: "Temporary Erosion and Sediment Control DSP–93–05A,"(12 pages total).

Generic Erosion Control Plans of the Missouri Highway & Transportation Department, denominated as special sheets 1 through 5, each entitled "Temporary Erosion Control Measures," dated Oct. 11,1993.

*Primary Examiner*—Tamara Graysay
*Assistant Examiner*—Tara L. Mayo
*Attorney, Agent, or Firm*—Jonathan A. Bay

[57] ABSTRACT

A ditch check for controlling erosion or sediment run-off in a ditch or swale is configured as a generally planar panel. The panel has suitable water-conducting passages to permit and is given holes to insert anchor stakes to anchor the panel to the ground. The panel is preferably made substantially of a polymer or resinous moldable material. The panel is given such formed side edges that adjacent panels can overlap or enmesh one another where they meet to close a gap therebetween. It is optional that the panel be stackable with other like panels, for greater convenience during non-use periods, as while being transported and/or during storage. Given the foregoing, the panel is meant to replace straw bales as ditch checks because the panel is very much lighter, is non-absorbent and inexpensive, and is indefinitely reusable.

24 Claims, 7 Drawing Sheets

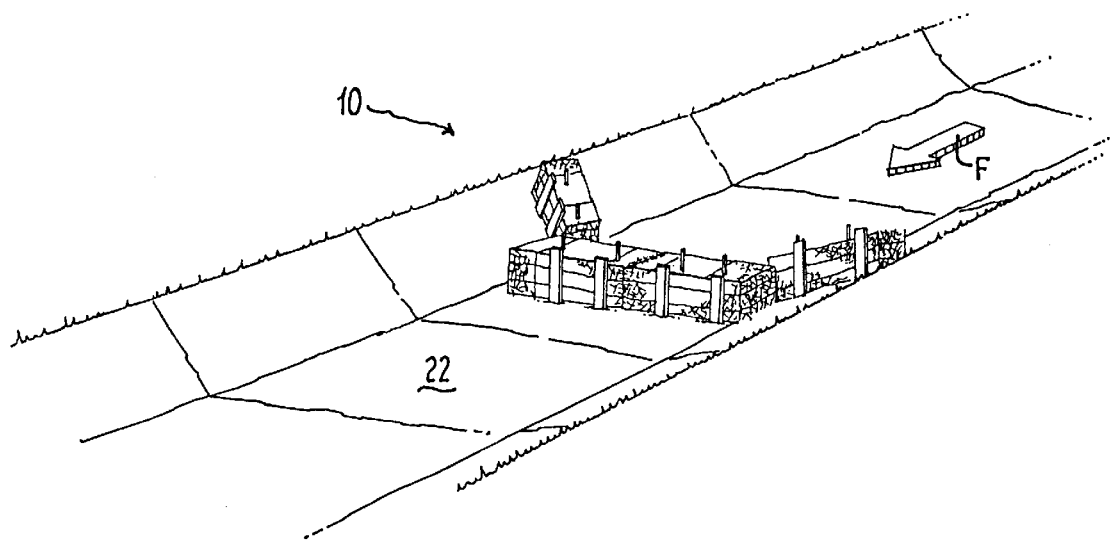
Fig. 1.
(PRIOR ART)
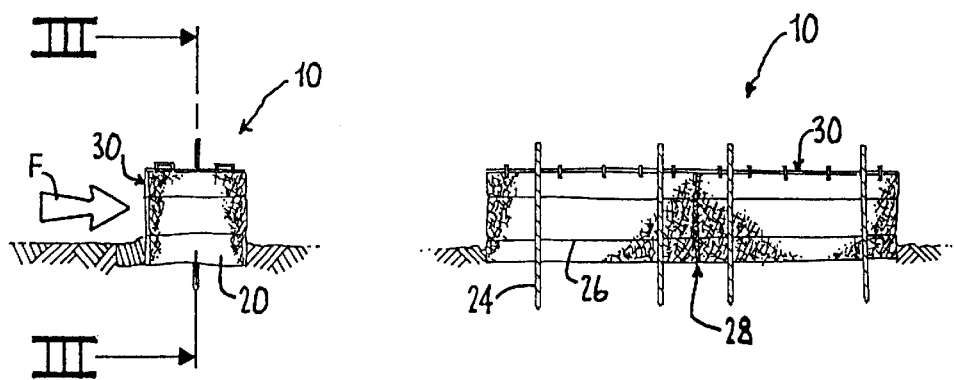
Fig. 2.
(PRIOR ART)
Fig. 3.
(PRIOR ART)

5,921,709

PANEL DITCH CHECK FOR TEMPORARY EROSION AND SEDIMENT CONTROL

CROSS-REFERENCE TO RELATED APPLICATION

This application is a continuation-in-part of U.S. application Ser. No. 08/555,906, filed Nov. 13, 1995, now U.S. Pat. No. 5,622,448.

BACKGROUND OF THE INVENTION

1. Field of the Invention

The invention relates to sediment barriers which are installed in stormwater run-off ditches to control erosion and sediment run-off into to natural watercourses. More particularly, the invention relates to such barriers as are commonly used on highway construction projects while land is being disturbed as by grading, clearing or excavating and the like. The ditch check in accordance with the invention partly dams up and slackens the stormwater run-off in the ditch, to promote the accumulation of sediment before the ditch check.

2. Prior Art

Ditch checks are required by some states as temporary erosion and sediment control measures during highway construction. Ditch checks are part of a larger integrated plan to prevent stormwater run-off from carrying into natural watercourses sediment from any land disturbed by construction. Generally, the ditch checks are required to remain in place until seeding and mulching operations protect the disturbed land such from erosion.

The requirement for ditch checks originates in the Federal Clean Water Act, 35 U.S.C. 1251 et seq., and devolves through several tiers of federal and state laws and regulations, to appear by name in state-administered permit programs. This happens as follows. The Federal Clean Water Act includes a program denominated as the National Pollutant Discharge Elimination System (NPDES), 33 U.S.C. 1342, for which is established minimum criteria and standards that appear in 40 C.F.R. 125.1 et seq. The NPDES criteria and standards are policed via permit programs, some which are administered federally by the Environmental Protection Agency—i.e., 40 C.F.R. 122.1 et seq.—and others whose administration is delegated to the states, 40 C.F.R. 123.1 et seq. Construction activities as clearing, grading and/or excavation which disturb five or more acres of land, require permits. 40 C.F.R. 122.26(b)(14)(x).

Missouri, for example, has enacted its NPDES permit program into its Clean Water Law, RSMo 644.006 et seq., and, RSMo 644.051.1(3). Missouri has an executive department, the Department of Natural Resources, that is given the authority to "issue . . . permits in order to enforce the Missouri Clean Water Law and regulations and administer the NPDES." MoCSR, Title 10, 20-6.010(1)(A). Stormwater run off is specifically addressed in MoCSR, Title 10, 20-6.200.

There are two kinds of permits, an individual permit and a general permit. The state highway system is approved for coverage by general permits where appropriate. MoCSR, Title 10, 20-6.200(5)(A)1.C. And where not appropriate, an individual permit must be secured via an application for a "land disturbance" activity. Both kinds of permits are alike in requiring narrative descriptions of proposed "best management practices (BMPs)," wherein "best management practices" for land disturbance is a defined phrase, which definition includes but is not limited to "sediment (silt) fence and staked straw bale barriers." MoCSR, Title 10, 20-6.200 (1)(C)2.E.

A general permit for the state highway system has been granted to the Missouri Highway & Transportation Department (MoDHT). The MoHTD has an internal Design Manual which states the following, at section 4-09.5(2), last revised May 15, 1995. A temporary erosion and sediment control plan is required for all projects that disturb any land area. The purpose is to prevent the sediment that results from the contractor's activities from leaving the right of way, and intercept it before it enters crossroad drainage. Generic erosion control plans are available as "special sheets." At section 4-09.5(2)(c), the MoHTD Design Manual addresses ditch checks as follows. Ditch checks are used to contain sediment on the construction site, and there are three types. "Silt fence ditch checks" may be used for drainage areas of less than two acres. "Rock ditch checks" should be limited to ditches with grades of 4% or less. And "straw bale ditch checks" may be used in small ditches with grades of 2% and less.

The above-mentioned "special sheets" depict an exemplary straw bale ditch check 10 as shown herein by FIGS. 1, 2 and 3; as well as an exemplary rock ditch check 12 as shown by FIG. 4, and an exemplary silt fence ditch check 14, as FIG. 5 shows.

The MoHTD also has an internal design specification entitled "Temporary Erosion and Sediment Control DSP-93-05A." The special sheets and the design specification, if taken together, state the following regarding the use and maintenance of the different types of ditch checks.

FIG. 1 shows four bales of straw 20 installed in a ditch 22. Arrow F indicates a downstream direction of the stormwater run-off. Each bale 20 is anchored by stakes 24. The bales 20 are mashed together to minimize gaps therebetween, and are lashed together by wires 26. Loose straw 28 is wedged in the gaps to fill them. Whereas a geo-textile fabric 30 is optionally stapled to the bales 20, it is omitted for slopes of 2% or less, which is usually the case. The spacing between straw bale ditch checks 10 for slopes of 2% is every 100 feet (30 m) along the centerline of the ditch (not shown). The outer ends of the ditch check 10 are preferably higher than the middle to insure flow through or over the ditch check 10, and not around it. The purpose is to obstruct the flow of water and allow the deposit of sediment on the upstream side.

The stated maintenance program for straw bale ditch checks includes removal of sediment deposits after each storm event. Also, sediment deposits must be removed when they reach approximately one-half the height of the barrier. The straw bale ditch check is maintained for the duration of time that the upstream land area is disturbed, and afterwards until seeding and mulching operations produce sufficient ground cover to protect the disturbed area from erosion.

As shown by FIG. 4, a rock ditch check 12 is created from 2 inch×3 inch (5.1 cm ×7.6 cm) clean gravel 32, wherein 100% passes through a 3 inch grate and 95% is retained on a 2 inch grate. The gravel 32 is sloped on both the upstream and downstream surfaces 34 at a 2 to 1 slope. The height at the middle is limited to 2 feet (61 cm), and the outer lateral edges are approximately 6 inches (15 cm) higher in elevation to insure flow through and over the gravel barrier 12, but not around. The rock ditch check 12 shall be checked for sediment accumulation after each significant rainfall. Sediment shall be removed when it reaches one-half of the original height or before. Regular inspections shall insure that the center of the rock ditch check is lower than the edges. Erosion caused by high flows around the edges shall be corrected immediately. The rock ditch check shall remain in place until ground cover has sufficiently protected the relevant disturbed areas. After removal, the area beneath the rock ditch check shall be seeded and mulched immediately.

In FIG. 5, a silt fence ditch check 14 is shown installed across a ditch. The minimum height is 25 inches (64 cm) at the center. The fence 14 is supported by steel T-posts 36 or equivalents, at no more than 5 foot (1.5 m) spacing. The bottom of the ditch is trenched, and the fabric 38 is folded into the trench 40 and covered to a depth of between 6 and 12 inches (15 and 30 cm). Closer spacing, greater embedment depth and/or wider posts are used as necessary to insure adequate resistance to applied loads. A typical fabric is disclosed by U.S. Pat. No. 5,108,224—Cabaniss et al. The silt fence ditch check 14 shall be inspected immediately after each rainfall and at least daily during prolonged rainfall. Sediment shall be removed if the deposit approaches one-half the height of the fence, or else sooner. If required by heavy sediment loading in the fabric, a second silt fence shall be installed.

The foregoing thus details the different uses, maintenance schedules and inspection routines of the three varieties of ditch checks. Straw bale ditch checks are very common on highway construction projects. And with spacing typically at 100 feet (30 m) between straw bale ditch checks, a typical highway construction project deploys hundreds of them.

There are, however, shortcomings with the use and maintenance of straw bale ditch checks. In Missouri, contractors bid on average between $55.00 and $100.00 per installed ditch check. Whereas the materials used in the ditch check are economical, the installation, maintenance and repair is relatively costly. Dry bales of straw are relatively heavy and bulky, and require costly storage, transportation to the construction site, and labor in the field to accomplish installation in the mass quantities required.

In use, a straw bale ditch check is supposed to partly filter the water as well as obstruct it. However, the bales become waterlogged in a ditch carrying stormwater run-off, and load up beyond any capacity to filter. Thereafter, water runs over or around the edges of the bales of straw. When water runs around the edges of the straw, it promotes rather than inhibits erosion.

Experience discloses that, in a big rainfall, about three-fourths of the stormwater run-off finds its way around the edges, and no or little sediment is deposited in front. Repair of waterlogged bales of straw requires replacement. Then, the bales of wet straw weigh between 125 and 150 pounds if they can be removed as an entire piece. Usually, however, they bust up under their own weight, and require substantially more valuable time of workers to remove them and reinstall their replacements. It has happened that, during a six to eight month construction project, the straw bale ditch checks have had to been replaced five to six times.

Even when the straw bale ditch checks work as planned, and cause the sediment to deposit in front, the clearing away of the sediment deposit as required often results in damage to the bales by spades or machinery and the like.

What is needed is an improvement which overcomes the shortcomings associated with straw bale ditch checks.

SUMMARY OF THE INVENTION

It is an object of the invention to provide a replacement for straw bale ditch checks, which replacement should be lightweight, non-absorbent, inexpensive, and reusable.

It is an alternate object of the invention that the above replacement for straw bales be configured as a modular panel, and be formed with suitable water-conducting passages and given suitable formations and/or brackets for attaining anchorage to the ground.

It is another object of the invention that the above panel be made substantially of a polymer or resinous moldable material.

It is a further object of the invention to give the above panel have side edges formed in ways so that adjacent panels can overlap or enmesh one another where they meet and close any gap therebetween, and allow connection and disconnection between each other in a positive connection that permits relative pivoting between the panels.

It is an additional object of the invention to configure the above panel to be stackable with other like panels for greater convenience during non-use periods, as while being transported and/or when during storage.

These and other aspects and objects are provided according to the invention in a panel ditch check, for combining with similar panels, to form a ditch check barrier that provides temporary erosion and sediment control in a ditch or swale that occasionally carries stormwater run-off. Each panel, when oriented upright, has upper and lower edges extending between spaced left and right edges. The panel also preferably has a generally planar front surface to orient to face an upstream direction of the ditch or swale, and a rear surface spaced from the front surface. The panel is configured with a series of water-conducting passages which extend through the front and rear surfaces. The water-conducting passages are arranged to let water to flow through at various elevations between the upper and lower edges at rates controlled by varying the available cross-sectional area for letting the water through.

In use, a plurality of panels, perhaps three or four in small ditches, are installed across a width of the ditch or swale. Preferably a left edge of a given panel either overlaps, or enmeshes via a tongue and groove structure, a right edge of an adjacent panel. This overlapping or enmeshing advantageously closes the gap between the panels. To be more precise about overlapping and/or enmeshing, the advantages thereof are achieved when the panels are configured to have either matching superimposable flange structures, or, meshing tongue and groove structures, respectively.

The panels can also be pivoted together both to retain the two panels in a side-to-side relationship, and permit limited pivoted positions between two pivoted panels. It is preferred if a positive pivot connection is available for optional use. One example of such a positive pivot connection is a pivot pin inserted through holes in two overlapped panel in the bottom corners. The pivot pin can be retained via a conventional cottar or the like. However, it is preferred if an anchor stake is used as the "cottar." That way, the anchor stake can function both as a cottar for the pivot pin and another stake for the anchoring of the panels in the ditch or swale.

An inventive aspect relates to the sizing and configuring of the water-conducting passages. The object is to regulate the pass-through of storm water run-off such that a barrier of the panels partly dams up and slackens the rate of the stormwater run-off in the ditch or swale, and thereby promote the accumulation of sediment before the barrier, and thus provide temporary erosion and sediment control.

Preferably the panels are made substantially of a polymer or resinous moldable material so that the panels are relatively lightweight, non-absorbent and inexpensive, and indefinitely reusable. By way of non-limiting example, the material may be LLD polyethylene or the like. The panel can still includes pieces of hardware of another material—for example, such as medium and high density polyethylene, steel, teflon and so on to make sleeves for lining certain elongated holes—via an infusing method such as molding the hardware in place during a process of molding the panel.

The above-mentioned elongated holes are optionally included to insert an anchor stake therethrough, such as ½-inch (13 mm) diameter reinforcement bar. It is preferred, however, if the anchor stake not metallic but wooden for economy, wide availability, and ease of shaping on the job-site. The anchor stake is thus driven into a bottom of the ditch or swale, which typically is compacted soil. The elongated holes can be aligned to extend straight down through the panel. Alternatively, the elongated holes can be aligned to extend along an incline from an upper front direction to a lower rear direction, to better oppose the weight of water as the water level rises on the front surface. To give even more support against the weight of the water, the panel can feature a pair or so braces on its rear surface. As said, the braces stabilize and/or buttress the panel to stay upright despite rising water levels on the front surface. The above-mentioned inclined holes can extend through these braces if desired.

Another inventive aspect relates to configuring the rear surface of each panel so that one panel can stack in a back-to-back alignment with another comparably formed panel. Stacking is an especially convenience feature during periods of non-use, as while the panels are being transported to and fro, or are being stored, and so on. An optional improvement includes adding a set of protrusions and recesses in the rear surface, for insertion together with the respective recesses and protrusions of the other panel while stacked back-to-back. These inter-connecting protrusions and recesses give greater relative positional stability when two panels are stacked.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a straw bale ditch check of the prior art, for temporary erosion and sediment control, as shown temporarily installed in a ditch or swale that occasionally carries stormwater run-off;

FIG. 2 is a vertical sectional view thereof, wherein arrow F indicates the flow or downstream direction;

FIG. 3 is a sectional view taken along line III—III in FIG. 2;

DETAILED DESCRIPTION OF THE PREFERRED EMBODIMENTS

Figure 4:
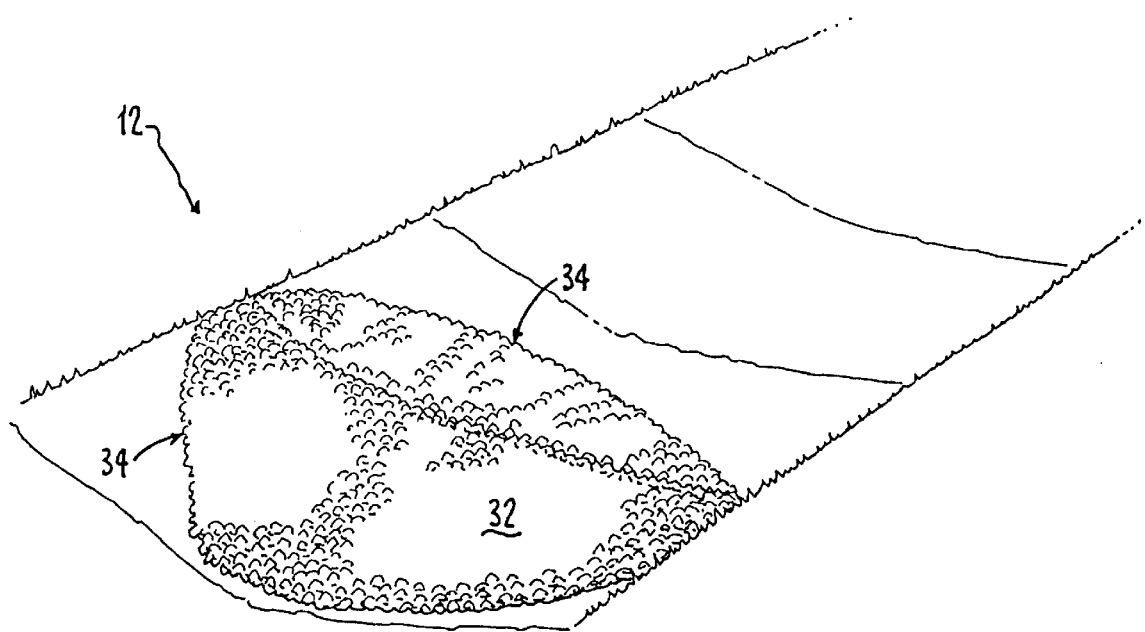
FIG. 4 is a perspective view, comparable to FIG. 1, of a rock ditch check of the prior art.
Figure 5:
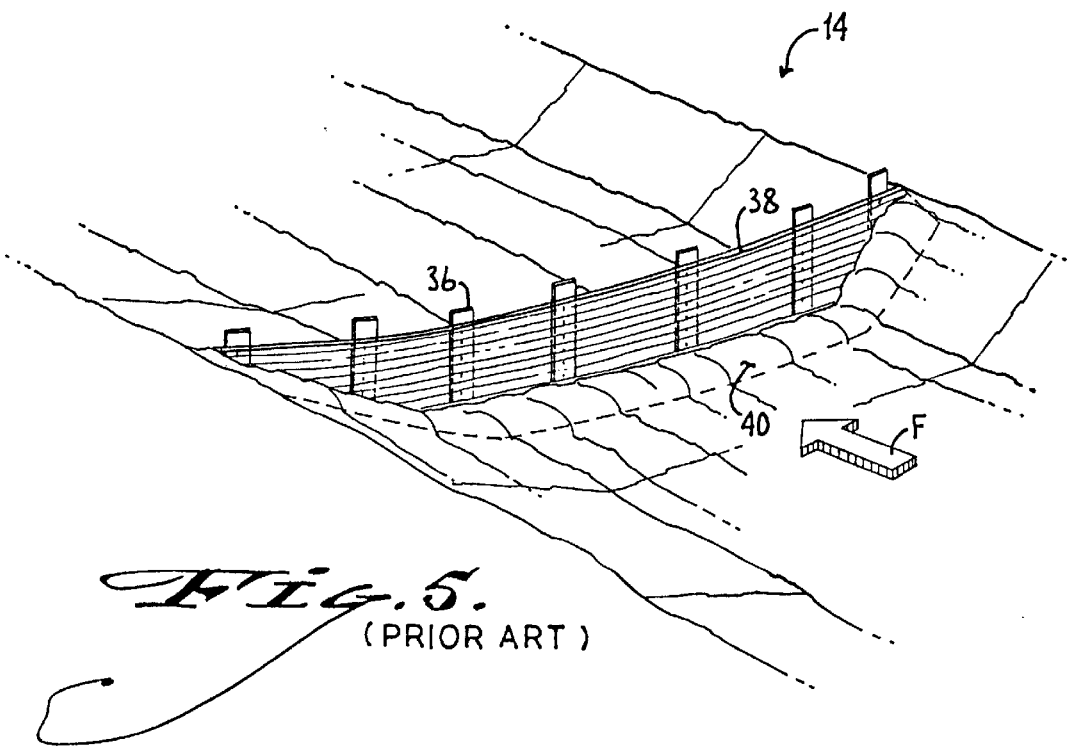
FIG. 5 is a perspective view, comparable to FIG. 1, of a silt fence ditch check of the prior art.
Figure 6:
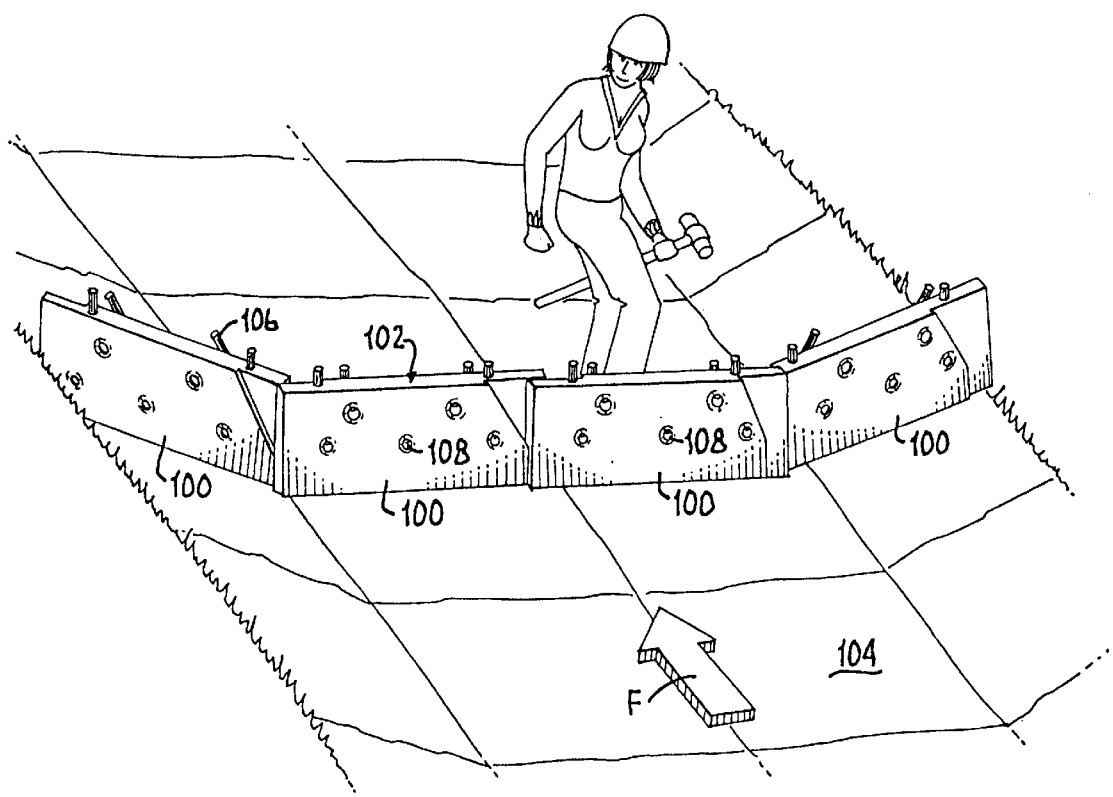
FIG. 6 is a perspective view of a panel ditch check in accordance with the invention, for temporary erosion and sediment control, also shown temporarily and reusably installed in a ditch or swale that occasionally carries stormwater run-off.

FIG. 6 shows a panel ditch check barrier 102 comprising panel ditch checks 100 in accordance with the invention. The barrier 102 is installed in a ditch or swale 104 that occasionally carries stormwater run-off, for temporary erosion and sediment control. The ditch check panels 100 are installed in upright positions and anchored in the ditch or swale 104 via stakes 106 that can be cut-to-size lengths of ½- inch (13 mm) diameter iron reinforcement bars, as commonly used in reinforcing concrete structures, but preferably are not metallic but wooden for economy, wide availability, and ease of shaping on the job-site. The reinforcement bars 106 can be driven into the ground via a mallet or like means, as shown in FIG. 6 as carried by a worker.

The panels 100 are aligned to extend transversely across the ditch or swale 104. Adjacent panels 100 are aligned relative each other for sufficient overlap at the side edges for the purpose, as more fully explained below. The panels 100 are formed with water-conducting passages 108 which extend fully through the panels 100. The water-conducting passages 108 are arranged at various elevations and are sized and configured to regulate the pass-through of stormwater run-off such that they collectively partly dam up and slacken the rate of stormwater run-off in the ditch or swale. In consequence, the barrier 102 promotes the accumulation of sediment before on an upstream surface thereof (arrow F indicates the downstream direction), and thus provides temporary erosion and sediment control.

Figure 7:
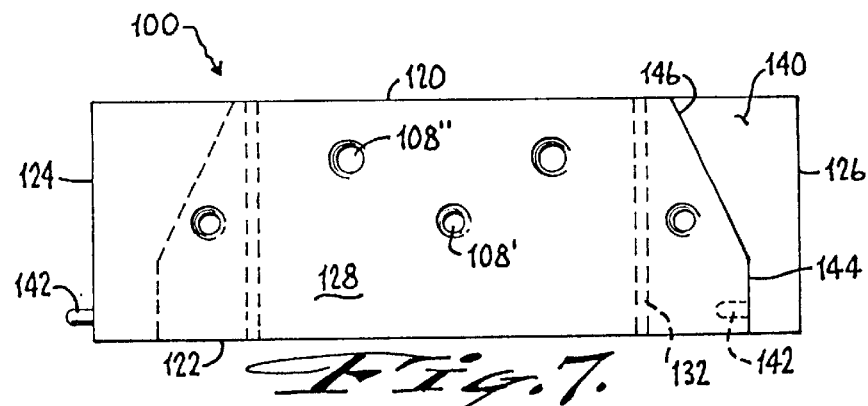
FIG. 7 is an enlarged scale, front elevation view of a given panel of the panels in FIG. 6.
Figure 8:
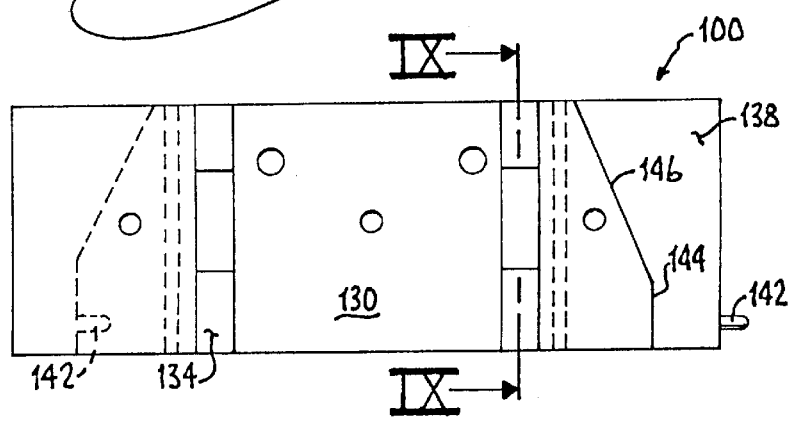
FIG. 8 is a rear elevation view thereof.

FIGS. 7, 8, 9 and 10 show one of the panels 100 oriented in an upright position (i.e., as each panel is generally oriented in FIG. 6). The panel 100 has upper and lower edges 120 and 122 extending between spaced left and right edges 124 and 126 ('right' being determined by from the vantage point of FIG. 7). FIG. 7 shows a front surface 128 of the panel 100, which is oriented to face the upstream direction of the ditch or swale 104 (see FIG. 6, and opposite direction to arrow F). FIG. 8 shows a rear surface 130 that is spaced from the front surface 128. Whereas FIGS. 6 through 10 show the panel 100 oriented upright, the panel 100 is usefully deployed in other orientations and, accordingly, terms like "upper" and "lower", "left" and "right", and "front" and "rear" are used merely for convenience in this description and do not limit the use and/or deployment of the panel in accordance with the invention.

The panel 100 has a series of three 1.5-inch (3.8-cm) diameter, water-conducting openings 108' spaced across a mid-elevation, and above them, a pair of 2-inch (5.1-cm) diameter openings 108". All the water-conducting passages have rounded-approach entrant regions (see FIG. 7), and sharp-edged outlets (i.e., FIG. 8). The panel 100 is configured in pair of ways to receive the anchor stakes. One way is, that the panel 100 is configured with four through-holes 132 (see FIG. 7) aligned on vertical axes that extend in the plane of the panel 100 and through the upper and lower edges 120 and 122. Another way is that a pair of brace structures 134 are formed from the rear surface 130 of the panel 100 (see FIG. 8). The brace structures 134 extend rearwardly and have foot pads to stand on the ground. The brace structures 134 include through-holes 136 aligned on axes that extend obliquely relative to the plane of the panel 100. The panel 100 is anchored by inserting anchor stakes 106 in the through-holes 132 and 136, and driving the stakes into the ground. That way, the panel 100 can withstand the water pressure against it in use, as the water level rises on its front surface 128.

The panel 100 has its left and right edges 124 and 126 formed with flange portions 138 and 140, and pin-and-socket structures 142, all which promote positional stability between adjacent panels 100. The right flange portion 140 is formed via an inset in the right front corner of the panel 100. In more difficult language, the right flange portion 140 is defined between the plane of the rear surface 130 and a midplane that bisects the front and rear surfaces 128 and 130. The left flange portion 138 is formed similarly, and diagonally opposite from the right flange portion 140. The flange portions 138 and 140 allow, for example, a right edge 126 of a given panel to overlap a left edge 124 of an adjacent panel, and thereby eliminate a gap between the panels. Water is not perfectly sealed from flowing between the overlapped panels, but the amount that does flow through is tolerable for the erosion and sediment control purposes of the panels.

These flange portions 138 and 140 are delimited by a lower, vertical-abutment surface 144 and an upper, inclined-abutment surface 146 that intersects the lower, vertical-abutment surface 144 at a midpoint. In FIG. 6, the middle two of panels 100 are adjacent each other along a common horizontal axis. These two panels are overlapped such that the respective flange portions 138 and 140 thereof abut the respective lower-vertical abutment surfaces 144 thereof. FIG. 6 also shows the furthest right one of the panels in a relatively pivoted position, relative to the panel adjacent to it. For two such panels that are relatively pivoted that way, the respective flange portions 138 and 140 abut the respective upper-inclined abutment surfaces 146 thereof. The abutment surfaces 144 and 146 permit relative clockwise and counterclockwise pivoting between about 22.5°. Greater angles of pivoting can be achieved by overlapping the panels in a reverse arrangement, such that the right margin of a front surface 128 of one panel overlaps the left margin of a rear surface 130 of an adjacent panel (not shown).

FIGS. 11, 12, 13 and 14 show an alternate embodiment of a ditch check panel 150 in accordance with the invention. It is comparable to the FIG. 7 embodiment except generally as follows.

Figure 14:
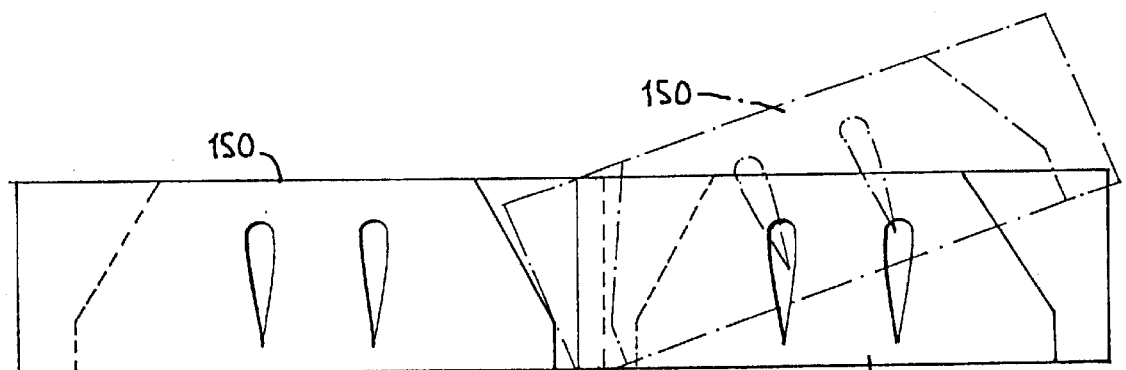
FIG. 14 is a front elevation view of two panels of the FIG. 11 embodiment, meshed together in edge-to-edge, tongue-and-groove alignment, wherein the right one of the two panels is shown—in broken lines—in a second and relatively pivoted position.

This panel 150 has a right edge formed as a tongue 152 and a left edge formed as a groove 154. This way, the tongue 152 of a given panel can be meshed with or in the groove 154 of an adjacent panel, as shown by FIG. 14. Each panel 150 has a pair of relatively inner and outer bolt holes 156 and 158 in the left and right margins thereof. The outer bolt holes 158 are positioned on the panels 150 such that they accept a bolt which partly acts as a pivot pin, to permit a meshed pair of panels 150 limited pivoted positions between the clockwise and counterclockwise extremes shown by FIG. 14.

The inner pair 158 of bolt holes permit two panels 150 to be bolted together in an overlapping arrangement, not the meshed tongue and groove arrangement, to allow even greater angles of relative pivoted movement (not illustrated). Other changes to this panel 150 include the water-conducting passages 160, which are elongated triangles. Also, this panel 150 has reduce-sized bracket portions 162 on the rear surface 130 thereof, although these are still formed with oblique through-holes.

Figure 9:
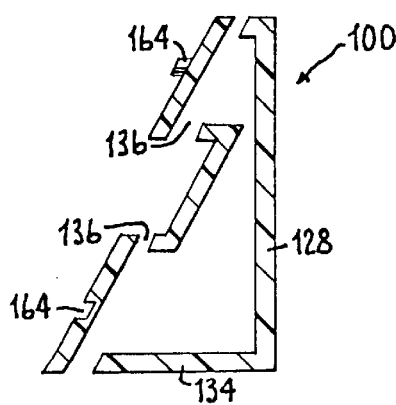
FIG. 9 is a sectional view taken along line IX—IX in FIG. 8.
Figure 10:
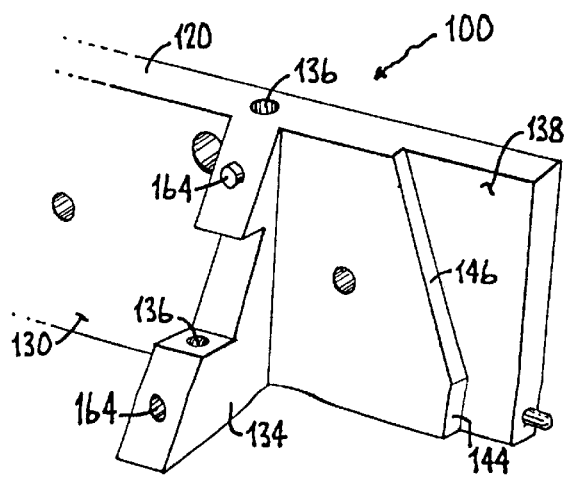
FIG. 10 is a perspective view of an upper, rear left corner thereof ('upper,' 'rear,' and 'left' as determined from the vantage point of FIG. 7)
Figure 11:
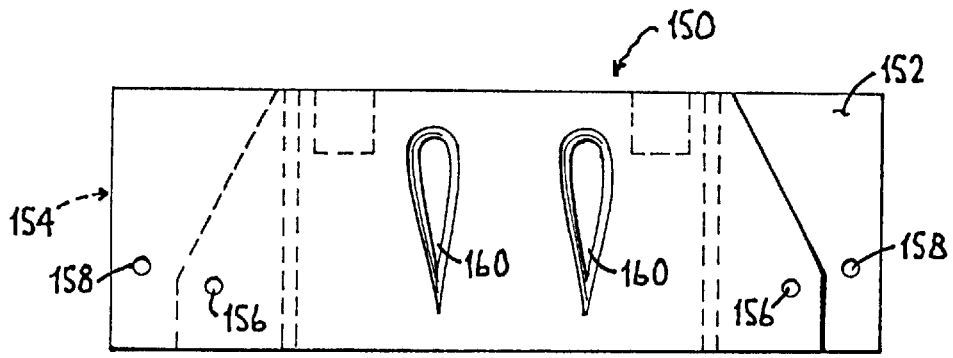
FIG. 11 is a front elevation view of an alternate embodiment of a panel ditch check in accordance with the invention.
Figure 12:
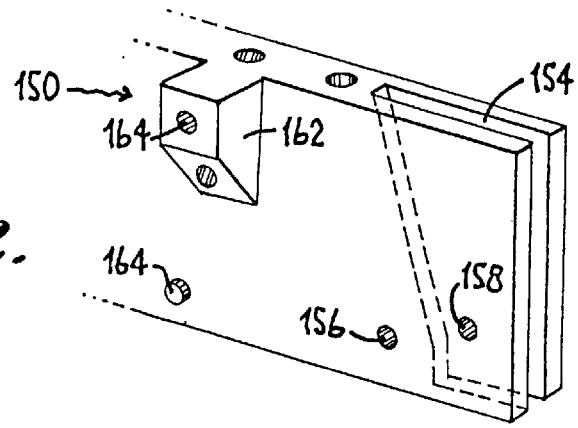
FIG. 12 is a perspective view of an upper, rear left corner thereof.
Figure 13:
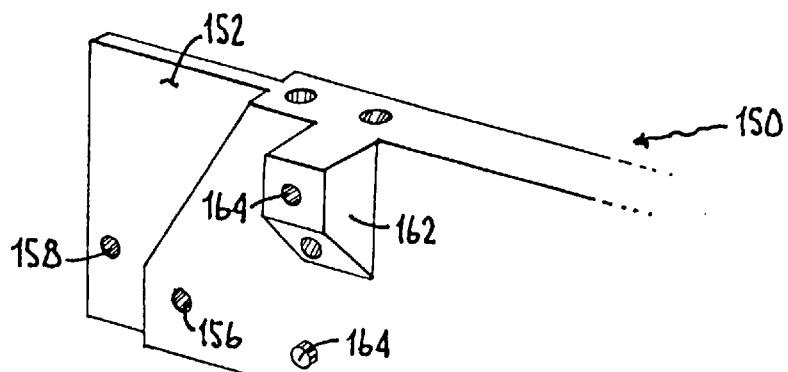
FIG. 13 is a perspective view of the opposite, upper rear corner thereof.
Figure 15:
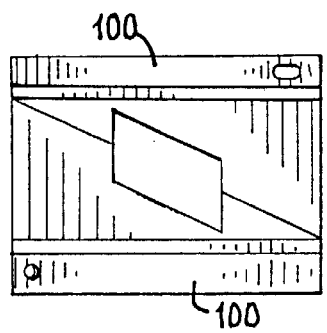
FIG. 15 is a side elevation view of two panels of the FIG. 6 embodiment stacked together in a back-to-back alignment.
Figure 16:
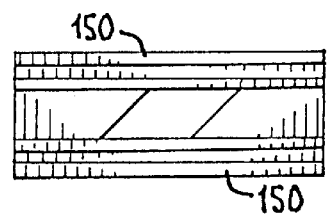
FIG. 16 is a view comparable to FIG. 15, except showing two panels of the FIG. 11 embodiment stacked together in back-to-back alignment.

FIG. 15 shows two panels 100 of the FIG. 7 embodiment stacked in a back-to-back alignment. FIGS. 9 and 10 show that this panel embodiment 100 has a set of pin and socket formations 164 in the brace portion 134, to improve positional stability while stacked. FIG. 16 likewise shows two panels 150 of the FIG. 11 embodiment stacked in back-to-back alignment. FIGS. 12 and 13 show a similar set of pin and socket formations 164. Given these configuration, panels of either embodiment in accordance with the invention, permit convenient stacking during non-use, as during transportation and/or storage.

Inventive aspects include the following. Each panel 100 or 150 is preferably fabricated from a suitable polymer or resinous moldable material which, by way of a non-limiting example, may be LLD polyethylene or the like. That way, each panel 100 or 150 weighs approximately seven to ten pounds (3.2 to 4.5 Kg) for a nominal size of 1.5 feet×4 feet (45 cm×1.2 m), and 2 inches (5.1 cm) between front to back, with a quarter-inch (6.4 mm) nominal wall thickness. Thus each panel 100 or 150 is nearly ten times lighter than a dry bale of straw. A single construction worker can handle many more panels 100/150 at a time bales of dry straw. Fewer workers would be required to install and/or remove a series of barriers 102 of panels 100 or 150. As a further convenience, workers can carry the panels 100 or 150 by using the water-conducting passages (108 or 160 in FIGS. 6 and 11, respectively), as handholds.

Another inventive aspect is, that the panels 100 or 150 in accordance with the invention maintain their integrity after soaking, unlike bales of straw, which fall apart thereafter. The performance of the panels 100 or 150 is not diminished by water, as is the performance of bales of straw. Moreover, the panels 100 or 150 are indefinitely reusable, unless damaged by during handling and storage. And if ever damaged, the panels 100 or 150 are recyclable.

Figure 17:
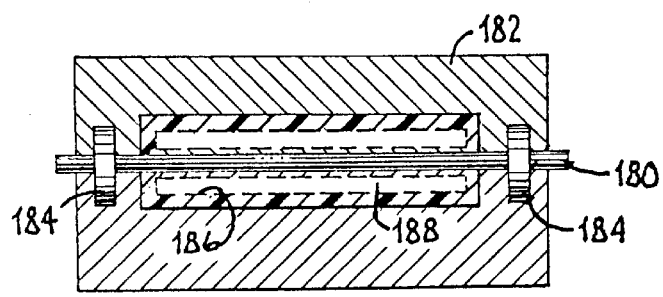
FIG. 17 is a side elevational, partial sectional view of a rotational-mold cavity, for rotational-mold fabrication of the panels in accordance with the invention from a polymer or resinous moldable material, showing a method for infusing a tubular sleeve of a different material into the material of the molded panels.

Preferably the panels 100/150 are fabricated in such a way that they are water tight. FIG. 17 shows a method of infusing a tubular sleeve 180 in a molded panel 100 or 150. The sleeve 180 shown in FIG. 17 is formed from steel, but other materials are comparably suitable, such as, for example, medium and high density polyethylene, teflon and so on. The tubular sleeve 180 is positioned to line one of the vertical through-holes (e.g., see numeral 132 in FIG. 7). More particularly, FIG. 17 shows a mold cavity 182 in a sectional view taken along a cutting plane containing the axis of the tubular sleeve 180. The seam or partition plane of the mold cavity 182 is hidden by the sleeve 180, as it extends perpendicular to this sectional view and intersects the axis the sleeve 180. The sleeve 180 is retained in position by disposable silicone washers 184. The thickness 186 of the panel material—i.e., the polymer or moldable resinous material—is shown in broken lines. After molding, the panel 186 would be removed (not shown) from the mold cavity 182 and the excess ends of the sleeve 180 would be trimmed flush to the panel 186. By these steps, the through-holes are water-tight against admitting water into the hollow interior 188 of the panel 186, 100 or 150. Also, the sleeves 180 more advantageously guide the insertion therethrough of the anchor stakes, which should be more convenient for workers in the field.

Figure 18:
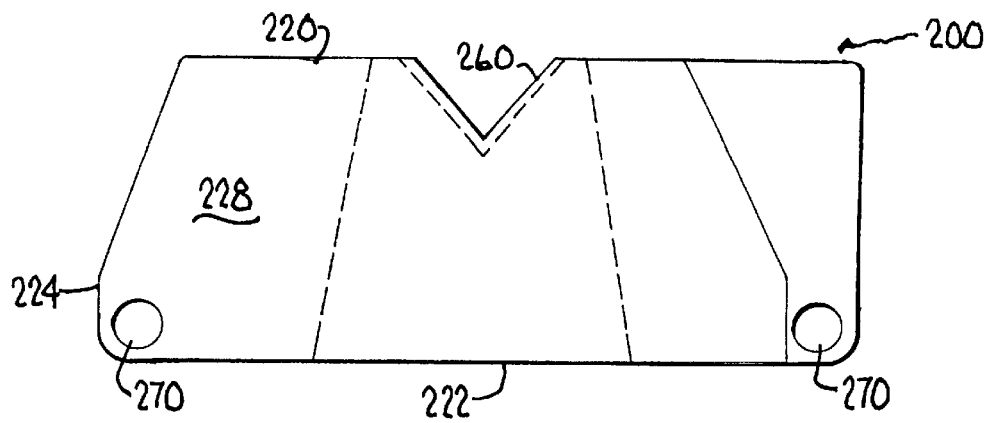
FIG. 18 is a front elevation view of another embodiment of a panel ditch check in accordance with the invention.
Figure 19:
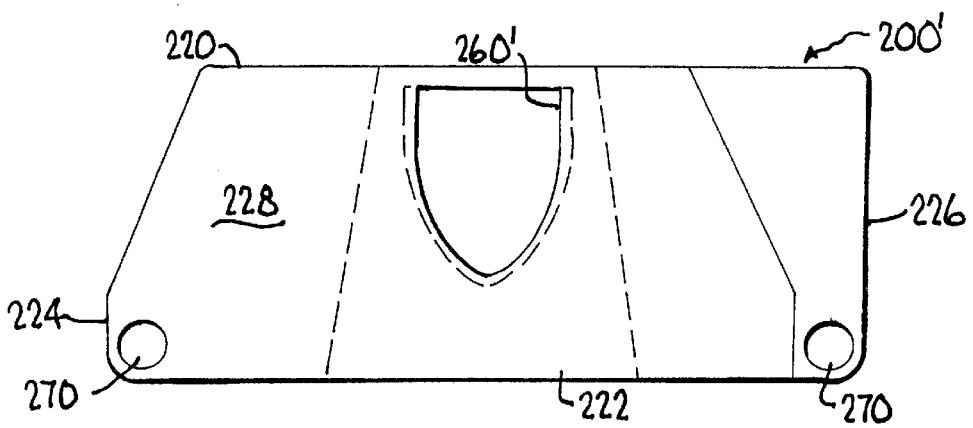
FIG. 19 is a front elevation view of an additional embodiment of a panel ditch check in accordance with the invention; and, FIG. 20 is a front elevation view of two panels of the FIG. 18 or 19 embodiments (with portions broken away), pinned together in an arrangement where a side edge of one panel overlaps a side edge of the other panel, in order to illustrate an alternate method and structure for connecting two like panels together in pivotal connection.

FIGS. 18 and 19 show further embodiments 200 and 200' of the panel ditch check in accordance with the invention. The panels 200 or 200' comprise upper and lower edges 220 and 222 extending between left and right edges 224 and 226 to define a front surface 228. A rear surface (not in view in either FIGS. 18 or 19) is also included and is formed much as has been described previously in connection with FIGS. 7 through 16.

Each of the FIGS. 18 and 19 panels 200 and 200' are formed with a single water-conducting opening therethrough. More particularly, the FIG. 18 panel is formed with a single V-shaped notch 260 recessed down into it from its upper edge 220. The FIG. 19 panel 200' is formed with a single opening 260' defining a V-shaped throat. When adjacent panels are arranged next to each other in a set (e.g., FIGS. 6 or 14), the single opening of 260 or 260' of each of panels 200 or 200' (which are not illustrated in an installation like FIG. 6) forms a set of openings in conjunction with the openings of the other panels in the set.

Figure 20:
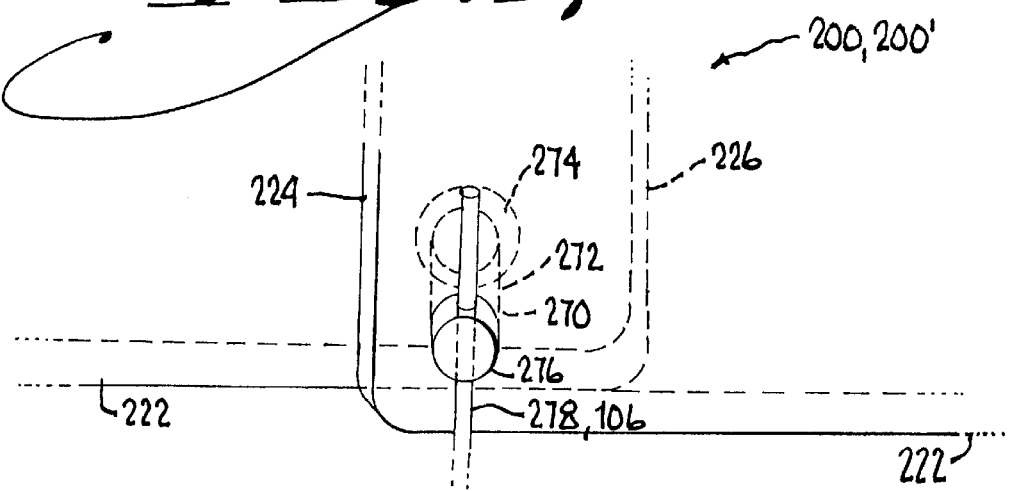

Other inventive aspects of the panels 200 and 200' relate to pin-holes 270 formed in the left and right bottom corners. FIG. 20 shows that the pin-holes 270 allow removable insertion of a pivot pin 272 therethrough to positively pin the left and right panels in FIG. 20 in a given pivot arrangement. Such a pivot arrangement will allow pivoting between the left and right panels in FIG. 20 comparably as is shown by FIG. 14. The pivot pin 272 has an enlarged head 274 on the back surface of the rear of the overlapped panels, although this head could be positioned on the front surface without any difference in function. The pivot pin 272's terminal end 276 is formed with a trans-axis hole that allows insertion of a retaining pin 278 as a cotter (eg., 278). In FIG. 20, the cotter 278 is in actuality one of the anchor stakes 106 that is preferably driven into the bottom of the ditch or swale (not shown, but see 104 in FIG. 6) to give the panels additional support when installed as shown in FIG. 6. Put differently, the anchor stake 106 in FIG. 20 has dual functions, in that it is both a cotter (eg., 278) and a means for anchoring the panels in the ditch or swale.

The pivot pin 272 could alternatively be formed as a permanent stud on one of the left and right panels in FIG. 20 (this is not shown). In still another embodiment of the pivot pin 272 (not shown), the pivot pin 272 could be arranged so that it semi-permanently attaches to one or another of the two panels. Thus one of the two panels serves as the base panel to which the pivot pin 272 is semi-permanently attached. The other panel is merely formed with the pin-hole 270 that permits simple insertion and withdrawal of the terminal end 276. The base panel thus semi-permanently "locks" with the pivot pin, and this can be achieved by any number conventional ways, including without limitation the following (not shown). One way to "lock" the pivot pin 272 with the base panel is by a conventional press fit arrangement. Another way is by a modified bayonet connection. In this modified bayonet connection, the hole in the panel is formed with a pair of opposed teeth and the cylindrical body of the pivot pin 272 is formed with complementary grooves. This can be reckoned as a form of an "inverted" bayonet connection, in which the pins or locking projections are formed in the collar structure (i.e., the panels in this instance) and the grooves are formed in the cylindrical inner member (i.e., the pivot pi 272 in this instance).

The pivot pin 272 is provided for convenience of the end-user of the panels 200 or 200'. The inclusion of availability of the pivot pin 272 does not mandate its use in every installation. Thus a user is free to lap or mesh two panels together without use of the pivot pin 272, if so desired by that user.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A panel ditch check for temporary installation in a ditch or swale that occasionally carries stormwater run-off, the panel comprising:

a body substantially of a polymer moldable material;

the body, when oriented in a given upright position, having upper and lower edges extending between spaced left and right edges, as well as having a front surface to orient to face an upstream direction of the ditch or swale, and a rear surface spaced from the front surface;

wherein the body is formed with at least one water-conducting opening through the front and rear surfaces thereof, and which is arranged to permit water to pass-through the panel at various elevations between the upper and lower edges;

at least one opening being sized and configured to regulate the pass-through of storm water run-off such that, when the panel is temporarily installed in the ditch or swale as generally oriented in the given upright position, the panel partly dams up and slackens the rate of the stormwater run-off in the ditch or swale, and thereby promotes the accumulation of sediment before the front surface thereof, and thus provides temporary erosion and sediment control;

wherein the panel body is further configured to include a brace portion on the rear surface thereof, to stabilize the panel body on a bottom of the ditch or swale in the given upright position; and, wherein the panel body is further configured with means for achieving anchoring of the panel body into a bottom of the ditch or swale via an anchor stake.

2. The panel of claim 1, wherein said anchor achieving means comprises holes in the panel body, which holes are sized to receive a given anchor stake therethrough.

3. The panel of claim 1, wherein the rear surface is arranged and configured to stack in a back-to-back alignment with another like panel for convenience during periods of non-use, as while being transported or during storage.

4. The panel of claim 3, wherein the rear surface further comprise a set of protrusions and recesses formed in the rear surface thereof, for insertion together with the respective recesses and protrusions of another like panel when stacked back-to-back, for greater relative positional stability while stacked.

5. A modular panel system for temporary installation in a ditch or swale that occasionally carries stormwater run-off, comprising:

a plurality of panels, each panel comprising a body which, when oriented in a given upright position, has upper and lower edges extending between spaced left and right edges, a front surface to orient to face an upstream direction of the ditch or swale, and a rear surface spaced from the front surface; and, each body being formed with at least one water-conducting opening which extends through the front and rear surfaces thereof, and which is arranged to permit water to pass-through at various elevations between the upper and lower edges;

wherein, the plurality of panels can be installed transversely across a width of the ditch or swale in such a manner that a left edge of a given panel, one of laps and meshes with a right edge of an adjacent panel;

said openings of the plurality of panels collectively being sized and configured to regulate the pass-through of storm water run-off such that, when installed, the plurality of panels partly dam up and slacken the rate of the stormwater run-off in the ditch or swale, and thereby promote the accumulation of sediment before the collective front surfaces thereof, and thus provide temporary erosion and sediment control;

wherein each panel body is further configured to include a brace portion on the rear surface thereof, to stabilize the panel body on a bottom of the ditch or swale in the given upright position; and, wherein each panel body is further configured with means for achieving anchoring of the panel body into a bottom of the ditch or swale via an anchor stake.

6. The modular panel system of claim 5, wherein each panel is formed substantially of a polymer or moldable material so that the panels are relatively lightweight, non-absorbent and inexpensive, and indefinitely reusable.

7. The modular panel system of claim 5, wherein the one of lapping and meshing between the left edge of the given panel and the right edge of the adjacent panel is achieved by further configuring the panels to comprise:

matching superimposable flange structures, and, meshing tongue and groove structures, respectively.

8. The modular panel system of claim 5, wherein said anchor achieving means comprises holes in the panel body between the upper and lower edges thereof, which holes are sized to receive a given anchor stake therethrough.

9. The modular panel system of claim 5, wherein the given panel and the adjacent panel further include a pivot connection therebetween, which pivot connection permits the given and adjacent panels to pivot, relative to their respective upright positions, between clockwise and counterclockwise extremes.

10. The modular panel system of claim 9, wherein the pivot connection includes a pin positively pinning the given and adjacent panels together in said pivot connection, which pin allows both connection and disconnection between the given and adjacent panels.

11. The modular panel system of claim 10, wherein the pivot connection further includes retention means for releasably fastening to the pin and retaining it in position while it pins the given and adjacent panels together in said pivot connection.

12. The modular panel system of claim 11, wherein said retention means comprises said pin being formed with a trans-axis hole and a cottar for inserting through the trans-axis hole.

13. The modular panel system of claim 12, wherein said cottar comprises an anchor stake.

14. The modular panel system of claim 10, wherein said pivot pin is removable from both the given and the adjacent panel.

15. The modular panel system of claim 5, wherein the rear surface of each panel is arranged and configured to stack in a back-to-back alignment with another of the plurality of panels for convenience during periods of non-use, as while the panels are being transported or are being stored.

16. A modular panel system for temporary installation in a ditch or swale that occasionally carries stormwater run-off, comprising:

a plurality of panels, each panel comprising a body which, when oriented in a given upright position, has upper and lower edges extending between spaced left and right edges, a front surface to orient to face an upstream direction of the ditch or swale, and a rear surface spaced from the front surface; and, wherein, the plurality of panels can be installed transversely across a width of the ditch or swale in such a manner that a left edge of a given panel, one of laps and meshes with a right edge of an adjacent panel;

wherein the given panel and the adjacent panel further include a pivot connection therebetween, which pivot connection permits the given and adjacent panels to pivot, relative to their respective upright positions, between clockwise and counterclockwise extremes, said pivot connection includes a pin positively pinning the given and adjacent panels together in said pivot connection, which pin allows both connection and disconnection between the given and adjacent panels;

wherein, when installed, the plurality of panels partly dam up and slacken the rate of the stormwater run-off in the ditch or swale, and thereby promote the accumulation of sediment before the collective front surfaces thereof, and thus provide temporary erosion and sediment control;

wherein each panel body is further configured to include a brace portion on the rear surface thereof, to stabilize the panel body on a bottom of the ditch or swale in the given upright position; and, wherein each panel body is further configured with means for achieving anchoring of the panel body into a bottom of the ditch or swale via an anchor stake.

17. The modular panel system of claim 16, wherein the pivot connection further includes retention means for releasably fastening to the pin and retaining it in position while it pins the given and adjacent panels together in said pivot connection.

18. The modular panel system of claim 17, wherein said retention means comprises said pin being formed with a trans-axis hole and a cottar for inserting through the trans-axis hole.

19. The modular panel system of claim 18, wherein said cottar comprises a given anchor stake.

20. The modular panel system of claim 16, wherein said pivot pin is removable from both the given and the adjacent panel.

21. The modular panel system of claim 16, wherein each panel is formed substantially of a polymer moldable material so that the panels are relatively lightweight, non-absorbent and inexpensive, and indefinitely reusable.

22. The modular panel system of claim 16, wherein the one of lapping and meshing between the left edge of the given panel and the right edge of the adjacent panel is achieved by further configuring the panels to comprise:

matching superimposable flange structures, and, meshing tongue and groove structures, respectively.

23. The modular panel system of claim 16, wherein said anchor achieving means comprises holes in the panel body between the upper and lower edges thereof, which holes are sized to receive a given anchor stake therethrough.

24. The modular panel system of claim 16, wherein the rear surface of each panel is arranged and configured to stack in a back-to-back alignment with another of the plurality of panels for convenience during periods of non-use, as while the panels are being transported or are being stored.

* * * * *